(12) United States Patent
Lee et al.

(10) Patent No.: US 12,440,158 B2
(45) Date of Patent: Oct. 14, 2025

(54) WEARABLE DEVICE

(71) Applicant: KT&G CORPORATION, Daejeon (KR)

(72) Inventors: Wonkyeong Lee, Guri-si (KR); Paul Joon Sunwoo, Seoul (KR); Min Kyu Kim, Seoul (KR); Soung Ho Ju, Daejeon (KR)

(73) Assignee: KT&G Corporation, Daejeon (KR)

( * ) Notice: Subject to any disclaimer, the term of this patent is extended or adjusted under 35 U.S.C. 154(b) by 0 days.

(21) Appl. No.: 18/031,110

(22) PCT Filed: Feb. 10, 2023

(86) PCT No.: PCT/KR2023/001962
§ 371 (c)(1),
(2) Date: Apr. 10, 2023

(87) PCT Pub. No.: WO2023/153851
PCT Pub. Date: Aug. 17, 2023

(65) Prior Publication Data
US 2024/0366152 A1    Nov. 7, 2024

(30) Foreign Application Priority Data
Feb. 14, 2022    (KR) ........................ 10-2022-0018676

(51) Int. Cl.
*A61B 5/00*    (2006.01)
*A61B 5/01*    (2006.01)
(Continued)

(52) U.S. Cl.
CPC ............... *A61B 5/681* (2013.01); *A61B 5/01* (2013.01); *A61B 5/02438* (2013.01);
(Continued)

(58) Field of Classification Search
None
See application file for complete search history.

(56) References Cited

U.S. PATENT DOCUMENTS 9,820,508 B2    11/2017    Arnel et al.
11,229,236 B1    1/2022    Arnel et al.
(Continued)

FOREIGN PATENT DOCUMENTS

CN    209609874 U    11/2019
CN    210841575 U    6/2020
(Continued)

OTHER PUBLICATIONS

Japanese Office Action on JP Appl. No. 2023-528458 dated Nov. 5, 2024.
(Continued)

*Primary Examiner* — Sana Sahand
(74) *Attorney, Agent, or Firm* — Foley & Lardner LLP (57) ABSTRACT

A wearable device includes a housing, a biometric information obtainer that is provided on one surface of the housing and obtains biometric information of a user, a functional material cartridge that is accommodated in the housing and stores a functional material, a mouthpiece connected to the functional material cartridge and configured to discharge the functional material, and a controller that provides a recommendation on inhalation of a functional material based on the biometric information obtained by the biometric information obtainer.

11 Claims, 5 Drawing Sheets

(51) Int. Cl.
*A61B 5/024* (2006.01)
*A61B 5/16* (2006.01)
*A61M 15/00* (2006.01)

(52) U.S. Cl.
CPC ............ *A61B 5/165* (2013.01); *A61B 5/4266* (2013.01); *A61B 5/4806* (2013.01); *A61M 15/0023* (2014.02); *A61M 15/0065* (2013.01)

(56) References Cited

U.S. PATENT DOCUMENTS

| | | | |
|---|---|---|---|
| 2015/0196251 A1* | 7/2015 | Outwater | A61B 5/14551 600/324 |
| 2016/0029697 A1 | 2/2016 | Shafer | |
| 2018/0373272 A1 | 12/2018 | Kihm et al. | |
| 2019/0357598 A1 | 11/2019 | Qiu | |
| 2020/0206439 A1 | 7/2020 | Klurfeld et al. | |
| 2021/0113145 A1 | 4/2021 | Emaminejad et al. | |
| 2021/0162128 A1 | 6/2021 | Manion | |
| 2022/0000182 A1 | 1/2022 | Atkins et al. | |

FOREIGN PATENT DOCUMENTS

| | | |
|---|---|---|
| CN | 211268665 U | 8/2020 |
| CN | 211486238 U | 9/2020 |
| CN | 211532793 U | 9/2020 |
| CN | 212814266 U | 3/2021 |
| JP | 2008-140156 A | 6/2008 |
| JP | 2017-012302 A | 1/2017 |
| JP | 2017-124058 A | 7/2017 |
| JP | 3225325 U | 2/2020 |
| JP | 3232012 U | 5/2021 |
| JP | 2022-11919 A | 1/2022 |
| KR | 10-2093349 B1 | 3/2020 |
| KR | 10-2222248 B1 | 3/2021 |
| KR | 10-2237855 B1 | 4/2021 |
| KR | 10-2272448 B1 | 7/2021 |
| KR | 10-2309201 B1 | 10/2021 |
| KR | 10-2322003 B1 | 11/2021 |
| WO | 2019/176179 A1 | 9/2019 |

OTHER PUBLICATIONS

International Search Report dated May 17, 2023 in International Application No. PCT/KR2023/001962.

Office Action issued Apr. 23, 2024 in Japanese Application No. 2023-528458.

Office Action issued Dec. 20, 2023 in Korean Application No. 10-2022-0018676.

* cited by examiner

WEARABLE DEVICE

TECHNICAL FIELD

The following embodiments relate to a wearable device.

BACKGROUND ART

Research on a wearable device that may be worn on a body of a user is being conducted. For example, Korean Patent Publication No. 10-2093349 discloses a neckband type wearable device.

DISCLOSURE OF INVENTION

Technical Problem

A wearable device according to an embodiment may provide a healthcare function by measuring biometric information.

A wearable device according to an embodiment may allow a user to inhale a functional material easily.

A wearable device according to an embodiment may quickly provide a recommendation on inhalation of a necessary functional material to a user based on measured biometric information.

Solution to Problem

According to an embodiment, a wearable device may include a housing, a biometric information obtainer provided on one surface of the housing and configured to obtain biometric information of a user, a functional material cartridge accommodated in the housing and configured to store a functional material, a mouthpiece connected to the functional material cartridge and configured to discharge the functional material, and a controller configured to provide a recommendation on inhalation of the functional material based on the biometric information obtained by the biometric information obtainer.

In an embodiment, the biometric information obtainer may include at least one of a heart rate monitor (HRM), a body temperature measuring sensor, an electrocardiogram (ECG) measuring sensor, a sweat measuring sensor, an inhalation sensor, a motion sensor, a blood nicotine measuring sensor, or a carbon monoxide measuring sensor.

In an embodiment, the recommendation on the inhalation of the functional material may be derived from at least one of stress information, exercise intensity information, smoking pattern information, sleep state information, blood nicotine information, or carbon monoxide information.

In an embodiment, the stress information may be derived by comparing first body temperature information, first ECG pattern information, or first heart rate information measured at a first point in time with second body temperature information, second ECG pattern information, or second heart rate information measured at a second point in time, respectively, and the controller may be configured to provide the recommendation on the inhalation of the functional material capable of alleviating stress, based on the stress information.

In an embodiment, the exercise intensity information may be derived by comparing first sweat ion concentration information, first body temperature information, or first heart rate information measured before exercise with second sweat ion concentration information, second body temperature information, or second heart rate information at a point in time after exercise, respectively, and the controller may be configured to provide the recommendation on the inhalation of the functional material including an energy-boosting element according to exercise intensity, based on the exercise intensity information.

In an embodiment, the controller may provide a recommendation on intensity or duration of smoking a cigarette, based on the smoking pattern information.

In an embodiment, the sleep state information may be derived based on a heart rate pattern and sensed motion information, and the controller may be configured to provide the recommendation on the inhalation of the functional material or switch to a power saving mode, based on the sleep state information.

In an embodiment, the controller may be configured to determine whether to send a notification that advises a user to refrain from smoking a nicotine material, based on the blood nicotine information.

In an embodiment, the wearable device may further include a communication unit configured to communicate with a mobile communication terminal, and the communication unit may be configured to transmit the recommendation on the inhalation of the functional material to the mobile communication terminal.

In an embodiment, the wearable device may further include a display configured to display the recommendation on the inhalation of the functional material.

In an embodiment, the mouthpiece may switch between a first state of being accommodated in the housing and a second state of being exposed to outside of the housing.

In an embodiment, the functional material cartridge and the mouthpiece may be integrally formed, and the functional material cartridge and the mouthpiece may be detached from the housing.

Advantageous Effects of Invention

According to an embodiment, a user may inhale a functional material easily.

According to an embodiment, it may be possible to measure biometric information easily and provide a recommendation on inhalation of a necessary functional material to a user, based on the measured biometric information.

According to an embodiment, an effective healthcare function may be provided.

The effects of a wearable device according to an embodiment are not limited to the above-mentioned effects, and other unmentioned effects may be clearly understood from the following description by one of ordinary skill in the art.

BRIEF DESCRIPTION OF DRAWINGS

The foregoing and other aspects, features, and advantages of embodiments in the disclosure will become apparent from the following detailed description referring to the accompanying drawings.

MODE FOR THE INVENTION

The terms used to describe the embodiments are selected from among common terms that are currently widely used, in consideration of their function in the embodiments. However, different terms may be used depending on an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure should be defined based on the meanings of the terms and all the content of the disclosure, rather than the terms themselves.

It will be understood that when a certain part "includes" a certain component, the part does not exclude another component but may further include another component, unless the context clearly dictates otherwise. Also, terms such as "unit," "module," etc., as used in the specification may refer to a part for processing at least one function or operation and which may be implemented as hardware, software, or a combination of hardware and software.

As used herein, an expression such as "at least one of" that precedes listed components modifies not each of the listed components but all the listed components. For example, the expression "at least one of a, b, or c" should be construed as including a, b, c, a and b, a and c, b and c, or a, b, and c.

Figure 1:
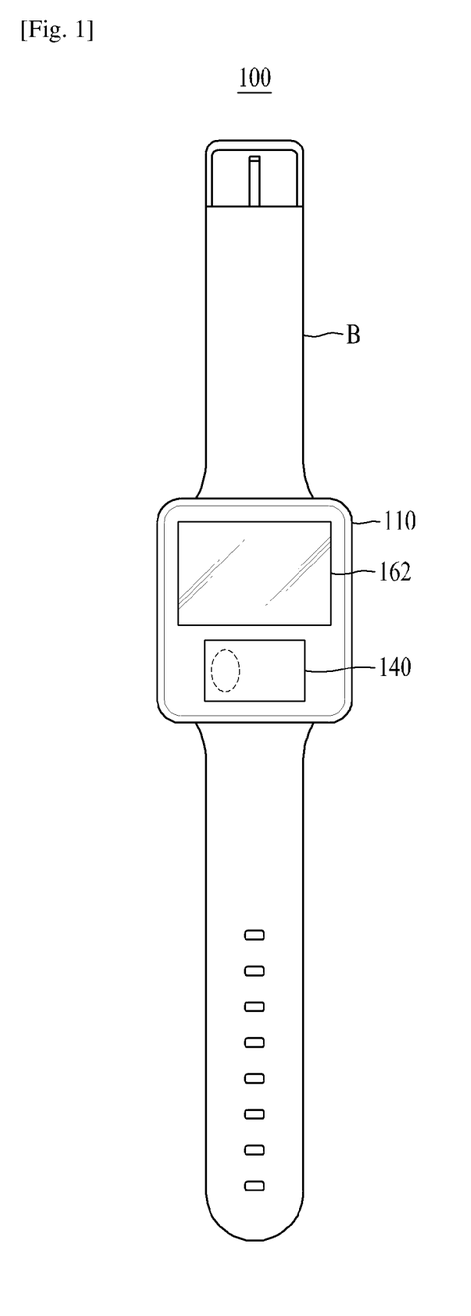
FIG. 1 schematically illustrates a wearable device according to an embodiment.
Figure 2:
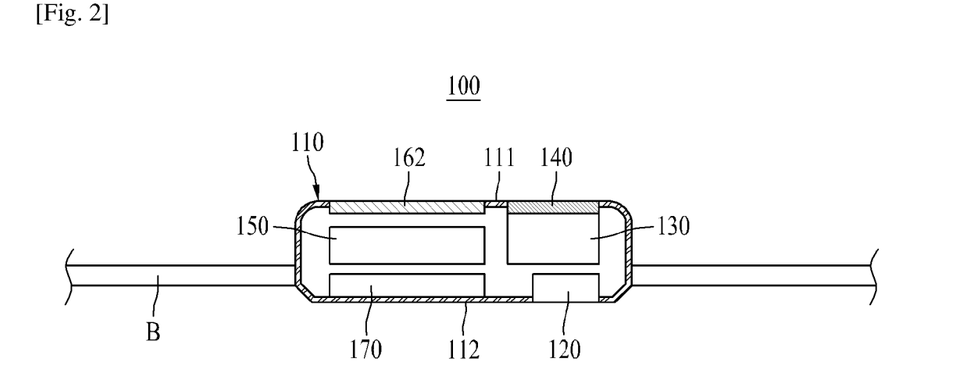
FIG. 2 illustrates a structure of a wearable device according to an embodiment.

FIG. 1 illustrates an exterior of a wearable device 100 according to an embodiment. FIG. 2 illustrates a structure of the wearable device 100 according to an embodiment, and FIG. 3 illustrates a use state of the wearable device 100 according to an embodiment.

Figure 3:
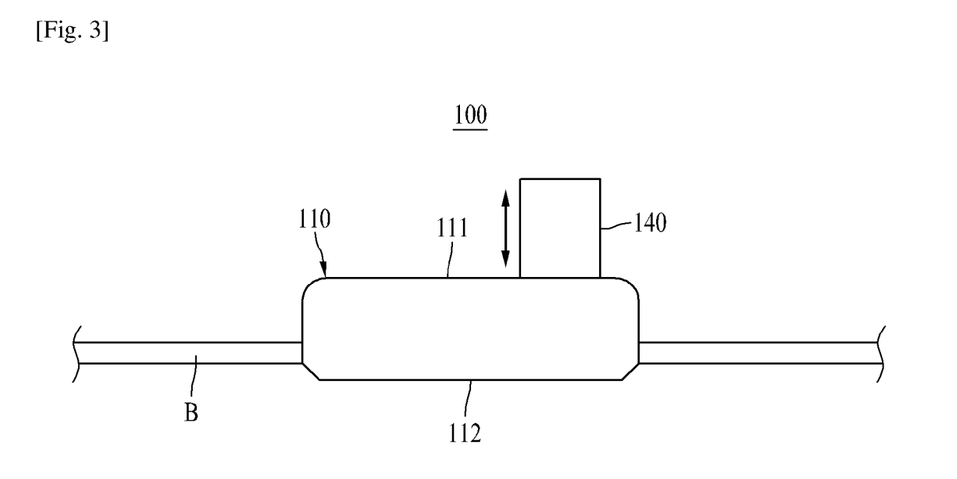
FIG. 3 illustrates a use state of a wearable device according to an embodiment.

Referring to FIGS. 1 through 3, the wearable device 100 may include a housing 110, a biometric information obtainer 120, a functional material cartridge 130, and a mouthpiece 140.

In an embodiment, the housing 110 may be connected to a wearing element B and worn on a body of a user in a state in which at least a portion of the housing 110 contacts the body of the user. For example, the wearing element B may have a band or strap shape, and pieces of the wearing element B may be disposed at ends of the housing 110 such that the pieces protrude from the ends and extend in a direction away from each other. The wearing element B may include a locking member disposed to be worn around a wrist of the user and a plurality of connecting grooves engaging with the locking member. The wearing element B may be made of various materials (e.g., a rubber material, plastic, metal, etc.) and configured to be detachable from the housing 110 according to a preference of the user. Thus, the wearing element B may impart various aesthetic senses to an exterior of the wearable device 100.

In an embodiment, the housing 110 may be made of a metal material. A portion (e.g., an edge) of the housing 110 may be made of the metal material, and another portion of the housing 110 may be made of a plastic material.

In an embodiment, the housing 110 may include a first surface 111 and a second surface 112, which face opposite directions. The first surface 111 and the second surface 112 may have a plate shape and include a curved surface at an edge portion. At least a portion of a display 162 or the mouthpiece 140 may be disposed on the first surface 111 of the housing 110, and at least a portion of the biometric information obtainer 120 may be disposed on the second surface 112 of the housing 110.

In an embodiment, the functional material cartridge 130 and a controller 150 may be accommodated in an inner space between the first surface 111 and the second surface 112 of the housing 110. A battery 170, a communication unit, a memory, and the like may be additionally accommodated in the inner space of the housing 110.

In an embodiment, the biometric information obtainer 120 may be provided on the second surface 112 of the housing 110 and obtain biometric information of the user. For example, the biometric information obtainer 120 may be shielded from another electronic component (e.g., a circuit board) in the housing 110, and thereby interference between them may be prevented.

In an embodiment, the biometric information obtainer 120 may include a heart rate monitor (HRM). For example, the HRM may sense vasoconstriction or vasodilatation by reflection of light according to a change in blood volume in blood vessels under the skin of the user. The controller 150 may calculate heart rate by receiving an electrical signal from the HRM.

In an embodiment, the biometric information obtainer 120 may include a body temperature measuring sensor. For example, the body temperature measuring sensor may include an infrared body temperature sensor and measure a temperature by measuring an amount of infrared rays emitted from the skin of the user.

In an embodiment, the biometric information obtainer 120 may include an electrocardiogram (ECG) measuring sensor. For example, the ECG measuring sensor may include a plurality of electrodes that may contact the skin of the user and measure a ECG pattern of the user.

In an embodiment, the biometric information obtainer 120 may include a sweat measuring sensor. For example, the sweat measuring sensor may include an ion sensor and measure an ion concentration pattern by sensing ion included in sweat of the user in real time.

In addition, the biometric information obtainer 120 may include an inhalation sensor, a motion sensor, a blood nicotine measuring sensor, an oxygen saturation level measuring sensor, a blood sugar measuring sensor, a blood pressure measuring sensor, or a carbon monoxide measuring sensor. The biometric information obtainer 120 may measure the number of inhalations, inhalation intensity, blood nicotine, an oxygen saturation level, blood sugar, blood pressure, or carbon monoxide during smoking.

In an embodiment, the functional material cartridge 130 may be disposed in the housing 110 and accommodate a functional material. The functional material may be a substrate in the form of a liquid or powder. For example, the functional material may include a flavoring composition, a food composition, a cosmetic composition, a pharmaceutical composition, or a mixture thereof. For example, the flavoring composition may include menthol, peppermint, spearmint oil, various fruit flavors, and the like. However, embodiments are not limited thereto. A food composition, cosmetic composition, or pharmaceutical composition that is easily inhaled by the user may be selected. For example, the food composition may include red ginseng, a vitamin, a nutritional supplement, magnolia berry, quince, sponge gourd, radish, ginseng, balloon flower root, pumpkin, pear, persimmon, citron, and the like, and the cosmetic or pharmaceutical composition may include a dental whitening material, a mouthwash, an anti-caries compound, an anticalculus compound, an antioxidant, an anti-inflammatory agent, a painkiller, an antihistamine, a local anesthetic, an antimicrobial compound, a germicide, an antibiotic, an antiasthmatic, and the like.

In an embodiment, the functional material cartridge 130 containing the functional material may be replaced.

In an embodiment, the mouthpiece 140 may be disposed on the first surface 111 of the housing 110. The mouthpiece 140 may be connected to the functional material cartridge 130 such that the functional material accommodated in the functional material cartridge 130 may be transmitted to the user through the mouthpiece 140. In an embodiment, the mouthpiece 140 may be configured to be switched between a first state and a second state. The first state is a state in which the mouthpiece is accommodated in the housing 110 when not in use, and the second state is a state in which the mouthpiece is exposed to the outside of the housing 110 when in use. For example, when a portion of the mouthpiece 140 exposed on the first surface 111 of the housing 110 is pressed, another portion of the mouthpiece 140 rises, allowing the mouthpiece 140 to protrude from the housing 110. Thus, a discharge portion of the functional material cartridge 130 and the mouthpiece 140 is connected to a mouth of the user, so that the functional material may be easily transmitted to the user.

In an embodiment, the functional material cartridge 130 and the mouthpiece 140 may be integrally formed. The functional material cartridge 130 and the mouthpiece 140 may be attached to and detached from the housing 110 together.

According to an embodiment, the wearable device 100 may further include a communication unit 180 for communication with a mobile communication terminal and a display 162 that is exposed on the first surface 111 of the housing 110 to display a recommendation on inhalation of the functional material, and the like. For example, the display 162 may provide other functions (e.g., a function of a watch that provides time information) of a wearable device in addition to the information on the inhalation of the functional material and may also provide biometric information of the user. In addition, various images or videos may be displayed through the display 162 for the convenience of the user.

According to an embodiment, the wearable device 100 may further include the controller 150 that provides the information on the inhalation of the functional material based on biometric information measured by the biometric information obtainer 120. The controller 150 is described in detail below.

Figure 4:
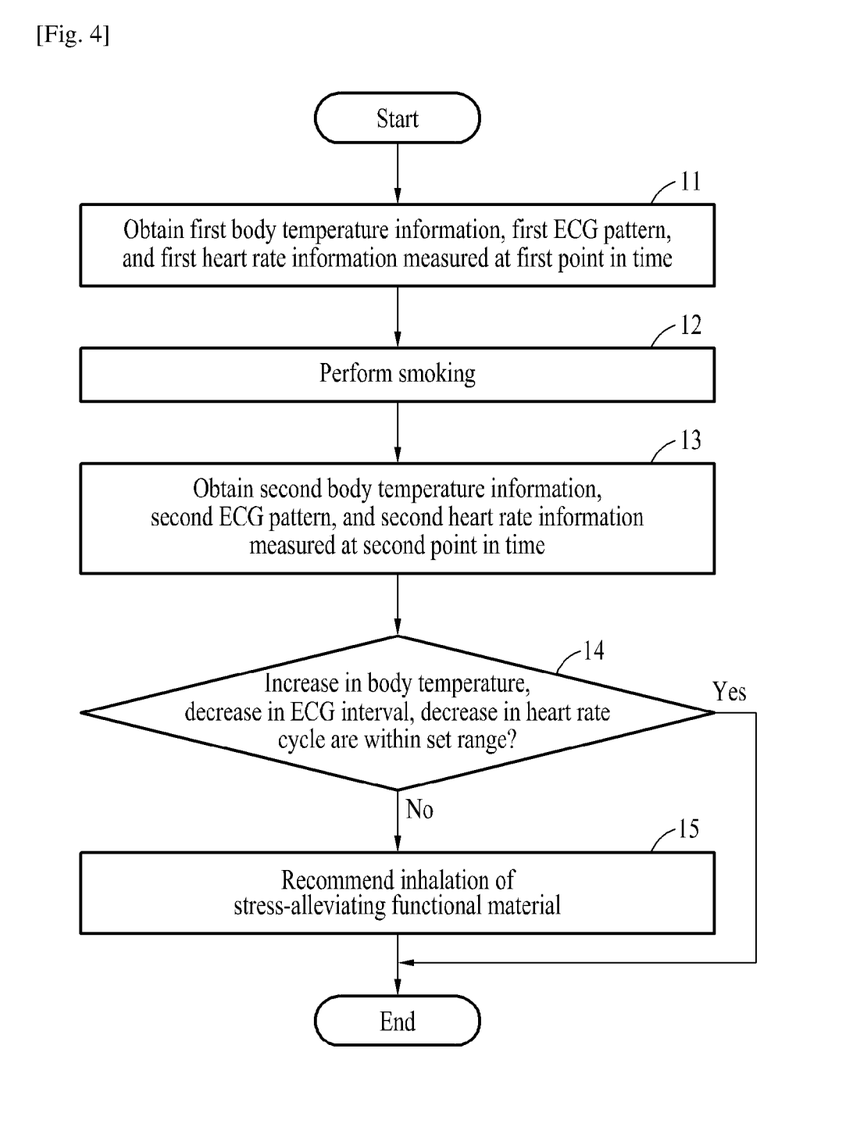
FIG. 4 is a flowchart illustrating that a wearable device provides a recommendation on inhalation of a functional material based on stress information according to an embodiment.
Figure 5:
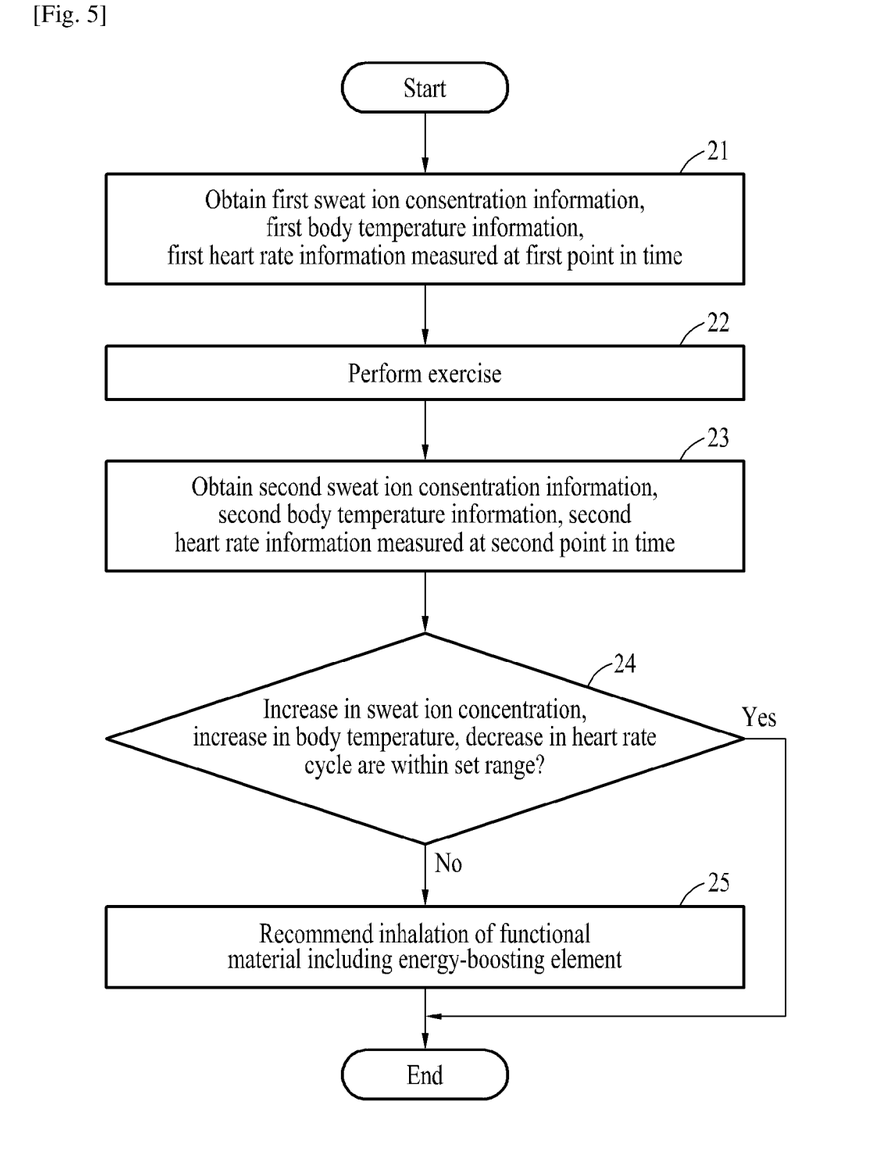
FIG. 5 is a flowchart illustrating that a wearable device provides a recommendation on inhalation of a functional material based on exercise intensity information according to an embodiment.

FIG. 4 is a flowchart illustrating that the wearable device 100 provides a recommendation on inhalation of a functional material, based on stress information according to an embodiment, and FIG. 5 is a flowchart illustrating that the wearable device 100 provides a recommendation on inhalation of a functional material, based on exercise intensity information according to an embodiment.

Referring to FIG. 4, the controller 150 may derive stress information and provide a recommendation on inhalation of a functional material that may alleviate stress of a user based on the stress information. For example, the controller 150 may check a stress level of the user by utilizing pieces of biometric index data measured by the biometric information obtainer 120. Also, the controller 150 may provide, through the display 162, information on the inhalation of the functional material, such as a recommendation on the functional material (e.g., aroma, vitamin B, and vitamin C) that may alleviate stress according to the checked stress level. Then, the user may replace a current cartridge with a stress-alleviating functional material cartridge containing a recommended stress-alleviating functional material and may relieve his or her stress by inhaling the stress-alleviating functional material.

In an embodiment, when the user unlocks the wearable device 100 or raises the mouthpiece 140, the wearable device 100 may be in a ready-to-use state. Subsequently, in operation 11, the controller 150 may control the biometric information obtainer 120 to measure an ECG pattern, a body temperature of the user, and heart rate information (pulse information) of the user at the first point in time. In operation 12, the user may smoke (e.g. smoke a cigarette) for a predetermined time (e.g., 10 seconds) or smoke by taking a predetermined number of puffs (e.g., 11 puffs or 14 puffs). Subsequently, in operation 13, the controller 150 may control the biometric information obtainer 120 to measure an ECG pattern of the user, a body temperature of the user, and heart rate information of the user at the second point in time. In operation 14, the controller 150 may derive stress information by comparing the biometric indices at the first point in time and the biometric indices at the second point in time, respectively. The controller 150 may determine whether the user is under stress based on whether an increase in the body temperature of the user, a decrease in an ECG interval, or a decrease in a heart rate cycle falls within a set range. For example, the controller 150 may determine that there is an increase in a stress index if the body temperature rises above the set range, if the ECG interval is shortened below the set range, or if the heart rate cycle is shortened below the set range. Alternatively, the controller 150 may determine that there is an increase in the stress index when two or more of the above-mentioned biometric indices fall outside the set range. When it is determined that there is an increase in the stress index based on a fact that the measured above-mentioned biometric indices fall outside the set range, the controller 150 may provide a recommendation of inhalation of stress-alleviating material including information on the stress-alleviating functional material (e.g., aroma, vitamin B, and vitamin C) to the user in operation 15. The recommendation on inhalation of the stress-alleviating functional material may be transmitted to the user through the display 162. The controller 150 may perform the operations by comparing stress information, which are provided from start of smoking a cigarette to end of smoking the cigarette, and also comparing a pattern stored during a current smoking period with a pattern exhibited at a start of a next smoking period.

In an embodiment, the controller 150 may derive smoking pattern information and provide a recommendation on intensity or a duration of a smoking a cigarette based on the smoking pattern information. For example, the controller 150 may measure a smoking pattern through the biometric information obtainer 120 (e.g., an inhalation center), monitor biometric indices, such as a heart rate and a body temperature of the user while the user is smoking, and recommend an optimal smoking pattern to the user.

In an embodiment, the controller 150 may receive the smoking pattern information (e.g., an inhalation duration and inhalation intensity) of the user obtained by the biometric information obtainer 120 (e.g., the inhalation center). At the same time, as described above, the controller 150 may periodically check temperature information, ECG information, and heart rate information of the user and determine that a stress index has risen when there is an increase in the body temperature, a decrease in the ECG interval, and/or a decrease in the heart rate cycle of the user. In response to determining that the stress index of the user has risen, the controller 150 may recommend a proper smoking pattern accordingly. For example, the controller 150 may recommend deep and slow inhalation as a smoking pattern through the display 162, and the like. On the other hand, in response to determining that the stress index of the user has fallen, the controller 150 may recommend a proper smoking pattern accordingly. For example, the controller 150 may recommend fast inhalation as a smoking pattern through the display 162, and the like.

Referring to FIG. 5, the controller 150 may derive exercise intensity information and provide a recommendation on inhalation of a functional material including an energy-boosting element to a user based on the exercise intensity information. For example, the controller 150 may recommend an appropriate functional material (e.g., caffeine and taurine) after measuring exercise intensity during exercise based on pieces of biometric index data (e.g., information on sweat, heart rate, body temperature, etc.) measured by the biometric information obtainer 120. Then, the user may replace a current cartridge with an energy-boosting functional material cartridge containing a recommended energy-boosting functional element and inhale the energy-boosting functional element.

In an embodiment, when the user unlocks the wearable device 100 or raises the mouthpiece 140, the wearable device 100 may be in a ready-to-use state. Subsequently, in operation 21, the controller 150 may control the biometric information obtainer 120 to measure a sweat ion concentration, a body temperature of the user, and heart rate information (pulse information) of the user at the first point in time. In operation 22, the user exercise for a predetermined period of time. Subsequently, in operation 23, the controller 150 may control the biometric information obtainer 120 to measure the sweat ion concentration of the user, a body temperature of the user, and heart rate information of the user at the second point in time. In operation 24, the controller 150 may derive the exercise intensity information by comparing the biometric indices at the first point in time and the biometric indices at the second point in time, respectively. The controller 150 may determine whether the user exercised and determine exercise intensity based on whether an increase in the body temperature of the user, an increase in the sweat ion concentration, or a decrease in a heart rate cycle falls within a set range. For example, the controller 150 may determine that the user exercised if the body temperature rises above the set range, if the sweat ion concentration rises above the set range, or if the heart rate cycle is shortened below the set range. Also, the controller 150 may determine the exercise intensity according to a degree of change in patterns. When it is determined that there is an increase in the exercise intensity based on a fact that the measured above-mentioned biometric indices fall outside the set range, the controller 150 may provide a recommendation on the energy-boosting functional material (e.g., caffeine and taurine) to the user in operation 25. Information on the energy-boosting functional material may be transmitted to the user through the display 162. Alternatively, the controller 150 may transmit the recommendation on the inhalation of the energy-boosting functional material to a mobile communication terminal through a communication unit (e.g., the communication unit 180 of FIG. 6).

In an embodiment, the controller 150 may determine whether the user is in a sleep state by utilizing the biometric index data measured by the biometric information obtainer 120 (e.g., a heart rate monitor and a motion sensor) and store a sleep pattern to send a notification to the user or to enter a power saving mode if the user is in the sleep state.

For example, when it is measured that a heart rate pattern is constant for a predetermined period of time (e.g., 10 minutes) and that there is no sensed motion, the controller 150 may determine that the user is in the sleep state. The controller 150 may continuously check the sleep pattern based on the heart rate pattern or motion information and store information indicating how stably the user sleeps. The controller 150 may provide information on the sleep pattern to the user and provide a recommendation on inhalation of a functional material that induces stable sleep depending on the sleep pattern of the user. In addition, the controller 150 may control the wearable device 100 to switch to the power saving mode when the user is in the sleep state.

In an embodiment, the controller 150 may recommend an optimal smoking pattern based on information on a blood nicotine measured by the biometric information obtainer 120 (e.g., a blood nicotine measuring sensor). For example, the user may set a maximum nicotine concentration, and the controller 150 may compare the information on blood nicotine measured by the biometric information obtainer 120 with the maximum nicotine concentration to send a notification that advises the user to refrain from smoking a nicotine material when the measured blood nicotine exceeds the maximum nicotine concentration. Alternatively, the controller 150 may provide a recommendation on inhalation of a functional material that mitigates the blood nicotine to the user when the measured blood nicotine exceeds the maximum nicotine concentration.

In an embodiment, the controller 150 may recommend healthcare-related information based on information on carbon monoxide measured by the biometric information obtainer 120 (e.g., a carbon monoxide measuring sensor) through exhalation of the user.

Figure 6:
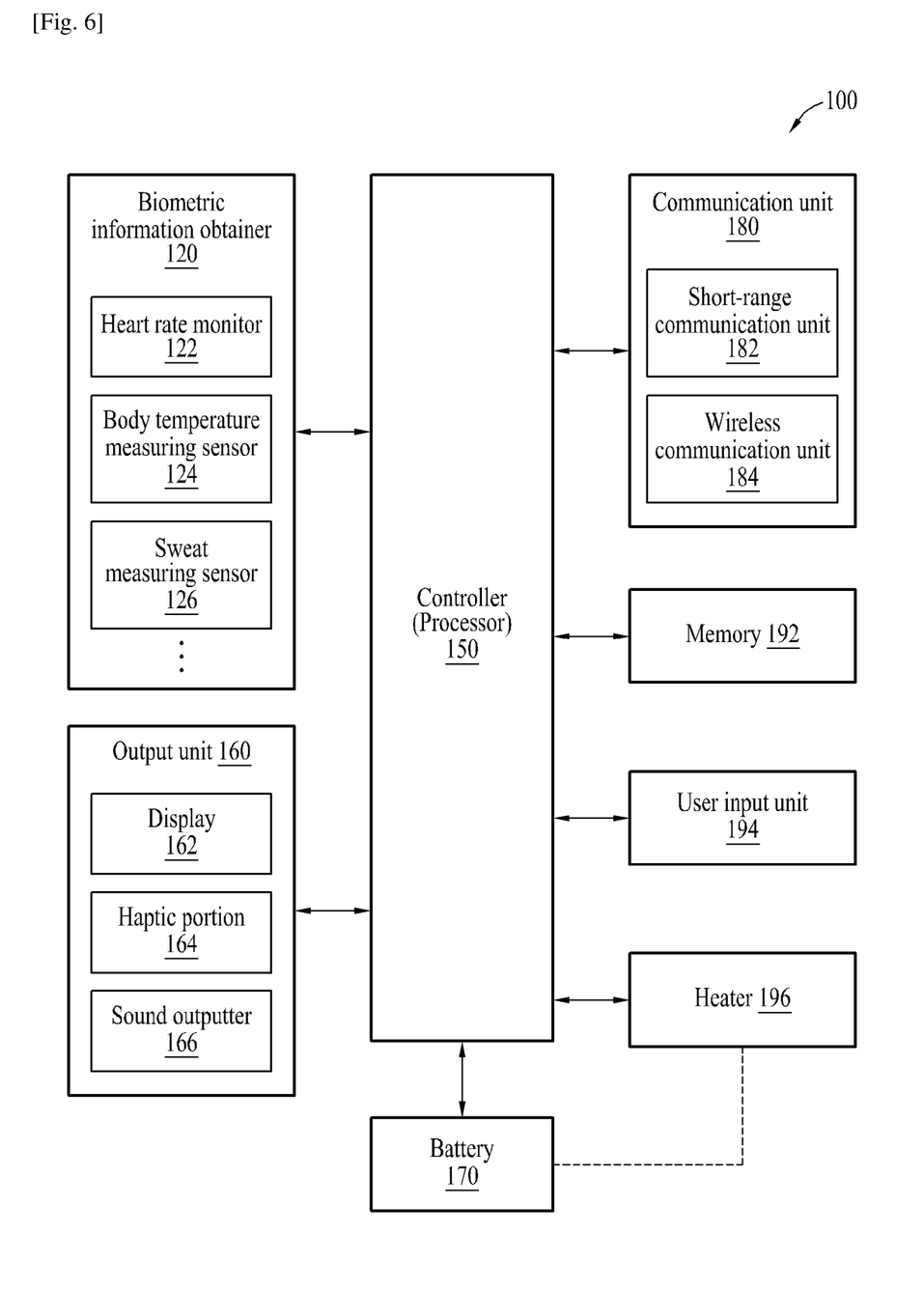
FIG. 6 is a block diagram illustrating a wearable device according to an embodiment.

FIG. 6 is a block diagram illustrating the wearable device 100 according to an embodiment.

Referring to FIG. 6, the wearable device 100 may include the controller 150, the biometric information obtainer 120, an output unit 160, the battery 170, a heater 196, a user input unit 194, a memory 192, and the communication unit 180. However, an internal structure of the wearable device 100 is not limited to what is shown in FIG. 6. It is to be understood by one of ordinary skill in the art to which the disclosure pertains that some of the components shown in FIG. 6 may be omitted or new components may be added according to the design of the wearable device 100.

The biometric information obtainer 120 may sense biometric information of a user wearing the wearable device 100 and transmit the sensed biometric information to the controller 150. In addition, the controller 150 may control the wearable device 100 to control operation of the heater 196, provide a recommendation on inhalation of a functional material, determine whether the functional material cartridge 130 is inserted, display a notification, and perform other functions.

The biometric information obtainer 120 may further include at least one of a humidity sensor, an atmospheric pressure sensor, a magnetic sensor, an acceleration sensor, a gyroscope sensor, a position sensor (e.g., a global positioning system (GPS)), a proximity sensor, or a red, green, blue (RGB) sensor (e.g., an illuminance sensor), in addition to the above-described sensors. A function of a sensor may be intuitively inferred from the name of the sensor by one of ordinary skill in the art, and thus, a more detailed description thereof is not included here.

The output unit 160 may output information on a state of the wearable device 100 and provide the information to the user. The output unit 160 may include at least one of the display 162, a haptic portion 164, or a sound outputter 166. However, embodiments are not limited thereto. When the display 162 and a touchpad are provided in a layered structure to form a touchscreen, the display 162 may be used as an input device in addition to an output device.

The display 162 may visually provide information on the wearable device 100 to the user in addition to the recommendation on inhalation of the functional material. The information on the wearable device 100 may include, for example, a charging/discharging state of the battery 170 of the wearable device 100, a preheating state of the heater 196, an insertion/removal state of the functional material cartridge 130, a limited usage state (e.g., an abnormal article detected) of the wearable device 100, or the like, and the display 162 may output the information. The display 162 may be, for example, a liquid-crystal display panel (LCD), an organic light-emitting display panel (OLED), or the like. The display 162 may also be in a form of a light-emitting diode (LED) device.

The haptic portion 134 may provide the information on the wearable device 100 to the user in a haptic way by converting an electrical signal into a mechanical stimulus or an electrical stimulus. The haptic portion 134 may include, for example, a motor, a piezoelectric element, or an electrical stimulation device.

The sound outputter 136 may audibly provide the information on the wearable device 100 to the user together with the recommendation on inhalation of the functional material. For example, the sound outputter 136 may convert an electrical signal into a sound signal and output the sound signal.

The battery 170 may supply power to operate the wearable device 100. The battery 170 may supply power to heat the heater 196. In addition, the battery 170 may supply power to operate the other components (e.g., the biometric information obtainer 120, the output unit 160, the user input unit 194, the memory 192, and the communication unit 180) included in the wearable device 100. The battery 170 may be a rechargeable battery or a disposable battery. The battery 170 may be, for example, a lithium polymer (LiPoly) battery. However, embodiments are not limited thereto.

The heater 196 may receive power from the battery 170 to heat the functional material. Although not shown in FIG. 6, the wearable device 100 may further include a power conversion circuit (e.g., a direct current (DC)-to-DC (DC/DC) converter) that converts power of the battery 170 and supplies the power to the heater 196.

The controller 150, the biometric information obtainer 120, the output unit 160, the communication unit 180, the user input unit 194, and the memory 192 may receive power from the battery 170 to perform functions. Although not shown in FIG. 6, the wearable device 100 may further include a power conversion circuit, for example, a low dropout (LDO) circuit or a voltage regulator circuit, which converts power of the battery 170 and supplies the power to respective components.

In an embodiment, the heater 196 may be formed of a predetermined electrically resistive material that is suitable. The electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, embodiments are not limited thereto. In addition, the heater 196 may be implemented as a metal heating wire, a metal heating plate on which an electrically conductive track is arranged, a ceramic heating element, or the like, but is not limited thereto. In another embodiment, the wearable device 100 may not include the heater 196.

The user input unit 194 may receive information input from the user or may output information to the user. For example, the user input unit 194 may include a keypad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like. However, embodiments are not limited thereto. In addition, although not shown in FIG. 6, the wearable device 100 may further include a connection interface such as a universal serial bus (USB) interface, and may be connected to another external device through the connection interface such as a USB interface to transmit and receive information or to charge the battery 170.

The memory 192, which is hardware for storing various pieces of data processed in the wearable device 100, may store data processed by the controller 150 and data to be processed by the controller 150. The memory 192 may be at least one of various types of storage medium, including a flash memory type memory, a hard disk type memory, a multimedia card micro type memory, a card type memory (e.g., an SD or XE memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The memory 192 may store an operating time of the wearable device 100, a maximum number of puffs, a current number of puffs, at least one temperature profile, data associated with a smoking pattern of the user, or the like.

The communication unit 180 may include at least one component for communicating with another electronic device (e.g., a mobile communication terminal). For example, the communication unit 180 may include a short-range communication unit 182 and a wireless communication unit 184.

The short-range wireless communication unit 182 may include a Bluetooth communication unit, a BLE communication unit, a near field communication unit, a wireless area network (WLAN) (wireless fidelity (Wi-Fi)) communication unit, a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communication unit 184 may include, for example, a cellular network communication unit, an Internet communication unit, a computer network (e.g., a LAN or a wide-area network (WAN)) communication unit, or the like. However, embodiments are not limited thereto. The wireless communication unit 184 may use subscriber information (e.g., international mobile subscriber identity (IMSI)) to identify and authenticate the wearable device 100 in a communication network.

The controller 150 may control the overall operation of the wearable device 100. In an embodiment, the controller 150 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the processor may be implemented in other types of hardware.

The above-described embodiments are merely examples, and it will be understood by one of ordinary skill in the art that various changes may be made and various equivalents may be used. Therefore, the scope of the disclosure should be defined by the appended claims, and all differences within the scope equivalent to those described in the claims will be construed as being included in the scope of protection defined by the claims.

The features and aspects of any embodiment(s) described above may be combined with features and aspects of any other embodiment(s) without resulting in apparent technical conflicts.

The invention claimed is:

1. A wearable device comprising:
 a housing;
 a biometric information obtainer provided on one surface of the housing and configured to obtain biometric information of a user;
 a functional material cartridge accommodated in the housing and configured to store a functional material;
 a mouthpiece connected to the functional material cartridge to discharge the functional material; and
 a controller configured to provide a recommendation on inhalation of the functional material based on the biometric information obtained by the biometric information obtainer, wherein
 stress information is derived by comparing first body temperature information, first electrocardiogram (ECG) pattern information, or first heart rate information measured at a first point in time with second body temperature information, second ECG pattern information, or second heart rate information measured at a second point in time, respectively, and
 the controller is configured to determine that there is an increase in a stress index if at least one of an increase in the body temperature of the user, a decrease in an ECG interval, or a decrease in a heart rate cycle does not fall within a set range, and to provide the recommendation on the inhalation of the functional material capable of alleviating stress.

2. The wearable device of claim 1, wherein the biometric information obtainer comprises at least one of a heart rate monitor (HRM), a body temperature measuring sensor, an ECG measuring sensor, a sweat measuring sensor, an inhalation sensor, a motion sensor, a blood nicotine measuring sensor, or a carbon monoxide measuring sensor.

3. The wearable device of claim 1, wherein the recommendation on the inhalation of the functional material is derived from at least one of stress information, exercises intensity information, smoking pattern information, sleep state information, blood nicotine information, or carbon monoxide information.

4. The wearable device of claim 3, wherein
 the exercise intensity information is derived by comparing first sweat ion concentration information, first body temperature information, or first heart rate information measured before exercise with second sweat ion concentration information, second body temperature information, or second heart rate information measured after exercise, respectively, and
 the controller is configured to provide the recommendation on the inhalation of the functional material comprising an energy-boosting element based on the exercise intensity information.

5. The wearable device of claim 3, wherein the controller is configured to provide a recommendation on intensity or duration of smoking a cigarette based on the smoking pattern information.

6. The wearable device of claim 3, wherein
 the sleep state information is derived based on a heart rate pattern and sensed motion information, and
 the controller is configured to provide the recommendation on the inhalation of the functional material capable of inducing stable sleep or switch to a power saving mode, based on the sleep state information.

7. The wearable device of claim 3, wherein the controller is configured to determine whether to send a notification that advises a user to refrain from smoking a nicotine material based on blood nicotine information.

8. The wearable device of claim 1, further comprising:
 a communication unit configured to communicate with a mobile communication terminal using one or more wireless network protocols,
 wherein the communication unit is configured to transmit the recommendation on the inhalation of the functional material to the mobile communication terminal.

9. The wearable device of claim 1, further comprising:
 a display configured to display the recommendation on the inhalation of the functional material.

10. The wearable device of claim 1, wherein a state of the mouthpiece is configured to switch between a first state of being accommodated in the housing and a second state of being exposed to the outside of the housing.

11. The wearable device of claim 1, wherein the functional material cartridge and the mouthpiece are integrally formed, and the functional material cartridge and the mouthpiece are detachable from the housing.

* * * * *